July 24, 1956 T. DOUMA 2,756,282

DIRECTIONAL AMPLIFIER SYSTEM AND APPARATUS

Filed Jan. 12, 1953 2 Sheets-Sheet 1

INVENTOR.
Tjiske Douma
BY Fisher & Swain
ATTORNEYS

DIRECTIONAL AMPLIFIER SYSTEM AND APPARATUS

Filed Jan. 12, 1953

INVENTOR.
Tjiske Douma
BY Flehr & Swain
ATTORNEYS

United States Patent Office 2,756,282

Patented July 24, 1956

2,756,282

DIRECTIONAL AMPLIFIER SYSTEM AND APPARATUS

Tjiske Douma, Haddonfield, N. J., assignor to Sierra Electronic Corporation, San Carlos, Calif., a corporation of California Application January 12, 1953, Serial No. 330,809

3 Claims. (Cl. 179—170)

This invention relates generally to amplifier systems and apparatus for application to line circuits of the type used for transmission of signal energy and particularly to amplifying means having directional characteristics.

In many systems wherein signals are transmitted in one or two directions over a line circuit, it is desirable to employ booster or repeater amplifiers. Networks for such amplifiers have been relatively complicated and expensive, and have required the use of special transformers. In general it is an object of the present invention to provide a novel system and apparatus of the above character which will enable amplification with the desired directional characteristics.

Another object of the invention is to provide a system of the above character which employs special directional coupling means to impart the desired directional characteristics.

Another object of the invention is to provide a system of the above character which can be arranged to provide two-way directional characteristics.

Another object of the invention is to provide a system of the above character which can be used for either continuous or interrupted line circuits.

Additional objects of the invention will appear from the following description in which the preferred embodiments have been set forth in detail in conjunction with the accompanying drawings:

Referring to the drawing.

Figure 1:
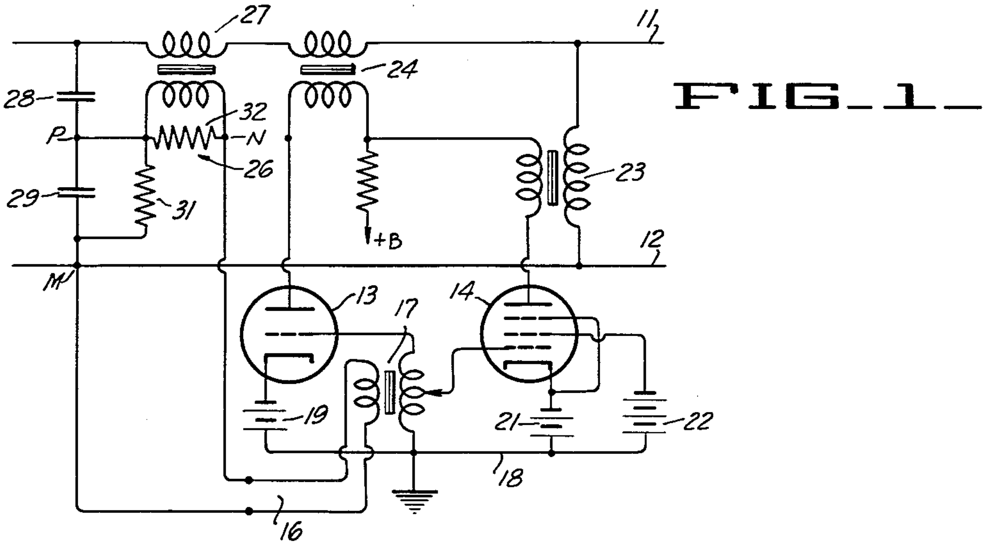
Figure 1 is a circuit diagram illustrating amplifier or booster means installed in connection with a line circuit, and having one-way directional characteristics.

The system illustrated in Figure 1 consists of vacuum tube amplifying means having input and output circuits, with these circuits coupled to a line circuit for amplifying or boosting signal frequencies. The coupling means is constructed to provide the desired directional characteristics by virtue of the phase relationship between transduced voltages.

In Figure 1 the line circuit is represented by the extended conductors 11 and 12. One end of this line may for example be connected to a transmitter of signal energy, while the other end may connect to a signal utilization circuit, such as a receiver or other load. It is assumed that at some point intermediate the ends of the line it is desirable to provide signal amplifying or booster means.

The amplifying means shown in Figure 1 consists of the vacuum tubes 13 and 14. The input circuit 16 for the tube 13 is coupled to the control grid by the transformer 17. The secondary of transformer 17 has its one terminal connected to the grounded conductor 18 and its other terminal connected to the control grid of tube 13. The cathode of tube 13 is also shown connected to ground through biasing means, such as the biasing battery 19.

An adjustable tap on the secondary of transformer 17 is connected to the control grid of the pentode tube 14. The cathode of tube 14 is directly connected to the suppressor grid, and also to ground through suitable biasing means, such as the battery 21. The screen grid is connected to the battery 22 or like biasing means. The plates of tubes 13 and 14 are both connected to a source of B battery voltage as illustrated, in series with the primaries of the transformers 23 and 24. The secondary of transformer 23 is connected in shunt with the line circuit, or in other words between the lines 11 and 12. The secondary of transformer 24 is connected in series with line 11, or in other words, in series with the line circuit.

With the arrangement just described, the tubes 13 and 14 have output circuits which are coupled by transformers 23 and 24 to the line circuit. As will be presently explained, the coupling means just described has directional characteristics in that energy supplied to the line circuit by the tubes 13 and 14, is additive in a direction toward the right and in opposed phase relationship toward the left.

Directional coupling means 26 serves to couple the line circuit to the input 16 of the amplifier. This coupling means includes a transformer 27 having its primary connected in series with the line circuit. It also includes the condensers 28 and 29 which are connected in series between the lines 11 and 12. Condenser 29 is shunted by the resistor 31. The point of connection between condensers 28 and 29 is connected to one terminal of the secondary of transformer 27. The transformer secondary is shunted by the resistor 32. One side of the amplifier input 16 is connected to the other terminal of the transformer secondary, while the other side is connected to line conductor 12.

The coupling means 26 is of the type disclosed in my co-pending application Serial Number 330,808, filed January 12, 1953, and entitled "Directional Apparatus for Use with High Frequency Transmission Lines."

The series condensers 28 and 29 form a high impedance which is shunted across the line circuit, and which functions as a voltage divider to derive a voltage appearing between the points P and M, that is proportional to the alternating voltage of the line. Transformer 27 forms a current transformer, and is designed to form a relatively low impedance in series with the line to derive a voltage proportional to the alternating current of the line circuit. The latter voltage is developed between the points P and N. The resultant of the two derived voltages serves to develop voltage between points M and N, to thereby excite the amplifier input.

With proper selection of values the coupling arrangement 26 is substantially completely directional. For alternating frequency energy flowing through the line in a direction from right to left, the phase relationship between voltages developed between points P and N, and P and M, can be made to be substantially 180° out of phase, and therefore no voltage is developed between points M and N. However, for energy flowing in a reverse direction, that is from left to right, the phase relationship between the derived voltages is such that resultant voltages are developed between points M and N, to excite the amplifier tubes 13 and 14. Likewise by proper selection of the various elements, the coupling arrangement can be made to have substantially uniform directional characteristics over a relatively broad band of frequencies.

The coupling arrangement provided by the transformer 23 and 24 has similar directional characteristics. With a proper selection of values for these transformers, the voltages applied to the line circuit can be made to be 180° out of phase for transmission toward the left as viewed in Figure 1, but in phase for transmission toward the right. As a result, when the voltages are of like magnitude, there is no direct feedback of energy from the output to the input of the vacuum tube amplifiers, and the amplified signal energy is transmitted toward the right, or in other words, in the same direction as the input signal.

With the arrangement of Figure 1 it is possible to omit the special coupling means 26, and to connect the input 16 directly across the lines 11 and 12. However in such event the amplifying means is excited by signal energy received in either direction, although the amplified energy is transmitted in one direction only.

It is desirable that the impedance of resistor 32 be small compared to the impedance of the inductance represented by the transformer 27. Use of this resistor makes it possible to operate over a relatively broad band of radio frequencies, with substantially 100% directional characteristics over the entire frequency range. In general it increases the frequency where the parasitic shunt capacitance presented by the primary of transformer 27, tends to play role. At higher frequencies the parasitic parallel capacitance presented by the transformer winding can cause a disturbing phase angle shift, thus effectively limiting the practical range of operation. The smaller the value of resistor 32, the lower such disturbing phase shift will be, thus effectively increasing the operating frequency band. Resistor 31 can be omitted in many arrangements although for very broad range radio frequency operation, it serves to maintain 100% directional characteristics at the lower end of the range.

The system described above can be used for audio frequencies, as for example in conjunction with telephone line circuits. Also it can be used for the higher carreir and radio frequencies.

Figure 2:
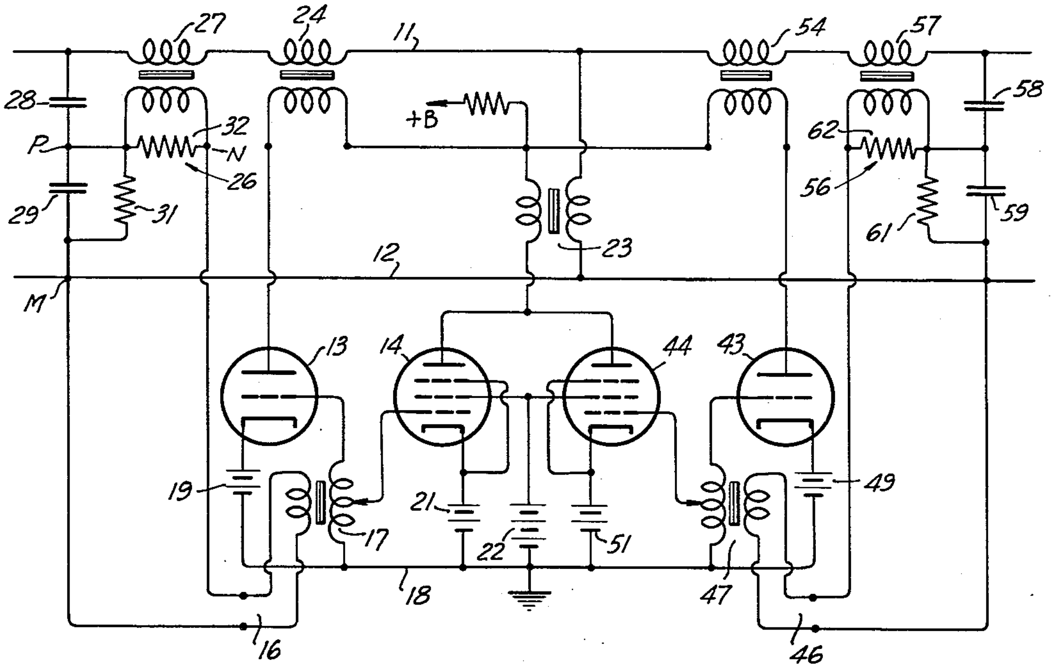
Figure 2 is another embodiment of the invention employing two amplifying means as illustrated in Figure 1, and which has two-way directional characteristics.

The system of Figure 2 incorporates the arrangement of Figure 1, but is adapted for two-way directional characteristics. In this instance a second amplifying means is provided utilizing the tubes 43 and 44, which correspond to the tubes 13 and 14. Input 46 of the tube 43 is connected to the primary of the transformer 47, and the secondary of this transformer is connected to the control grid of tube 43. The control grid of tube 44 is connected to an adjustable tap on the secondary of transformer 47. The biasing batteries 49 and 51 represent suitable biasing sources and correspond to the batteries 19 and 21. The plate supply voltage conductor 18 can be in common to both amplifying means. The transformer 23 has its primary connected to both the plates of tubes 14 and 44. Transformer 24 is connected in the same manner as in Figure 1. A corresponding transformer 54 connects between the source of plate voltage and the plate of tube 43.

A second directional coupling means 56 corresponds to the directional coupling means 26, and can include the transformer 57, condensers 58, 59 and resistors 61 and 62.

Operation of the system shown in Figure 2 is as follows: For transmission of signals from the left to the right, the operation is the same as in Figure 1. The directional coupling means excites the tubes 13 and 14, whereby voltages are applied to the line circuit by the transformers 23 and 24. Such voltages are 180° out of phase, and cancel each other for transmission to the left, but additive for transmission to the right.

Coupling device 56 is directional in favor of signal transmission to the left. Thus, such signal energy excites the tubes 43 and 44, with the result that voltages are applied to the line circuit by transformers 23 and 54, which are of such magnitude and phase relationship that amplified signal energy is transmitted to the left, but cancelled out for transmission to the right.

It will be evident that with the arrangement of Figure 2 the system is capable of boosting or amplifying signal energy received in either direction. Likewise, the amplified signal energy is transmitted in the same direction as received. There is no direct feedback between the input and outputs of the amplifying means.

Figure 3:
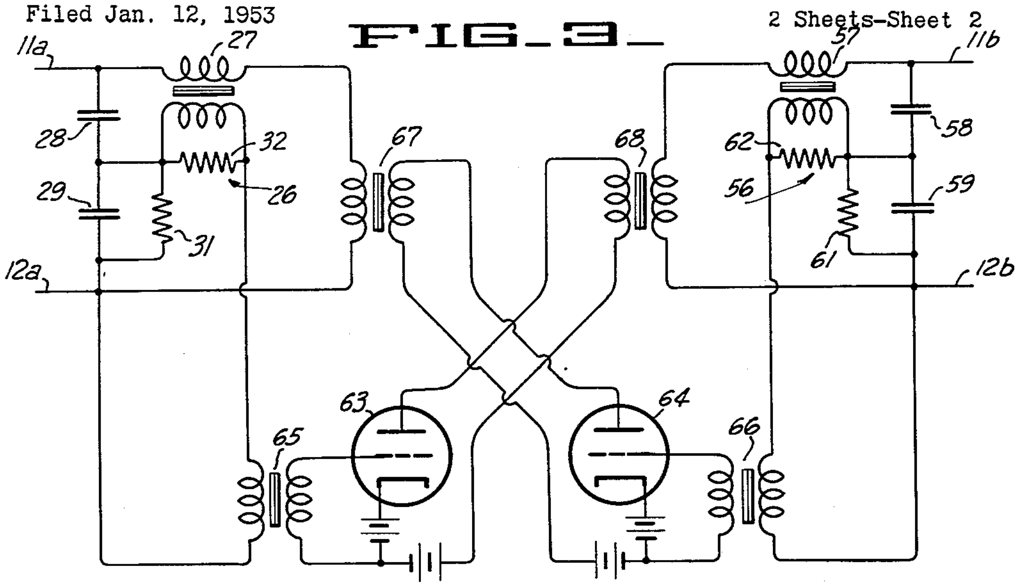
Figure 3 is a circuit diagram illustrating another embodiment of the invention having two-way directional characteristics, together with an interrupted line circuit.

Figure 3 illustrates a two-way directional system in which the line circuit is interrupted. In this system the vacuum tubes 63 and 64 have input circuits which are coupled by the transformers 65 and 66, to the directional coupling means 26 and 56. Coupling means 26 is connected to the line circuit formed by conductors 11*a* and 12*a* and coupling means 56 is connected with the line conductors 11*b* and 12*b*. Transformers 67 and 68 are coupled with the outputs of the tubes 63 and 64. Transformer 67 connects across the lines 11*a* and 12*a*, and has its primary connected in series with the plate circuit of tube 64. Transformer 68 has its primary connected in series with the plate circuit of tube 63, and its secondary connected across lines 11*b* and 12*b*.

Assuming that signal energy in Figure 3 is applied to the line conductors 11*a* and 12*a* by transmission from left to right, the input of amplifier tube 63 is excited, whereby transformer 68 applies an amplified signal to the conductors 11*b* and 12*b*. Because of its directional characteristics, the coupling means 56 does not apply any part of such signal energy to the input of tube 64. For signal transmission from right to left, the input of tube 64 is excited whereby an amplified signal is applied to conductors 11*a* and 12*a* by transformer 67. Here again the directional characteristics of coupling means 26 prevents such amplified signal energy from exciting the tube 63.

Figure 4:
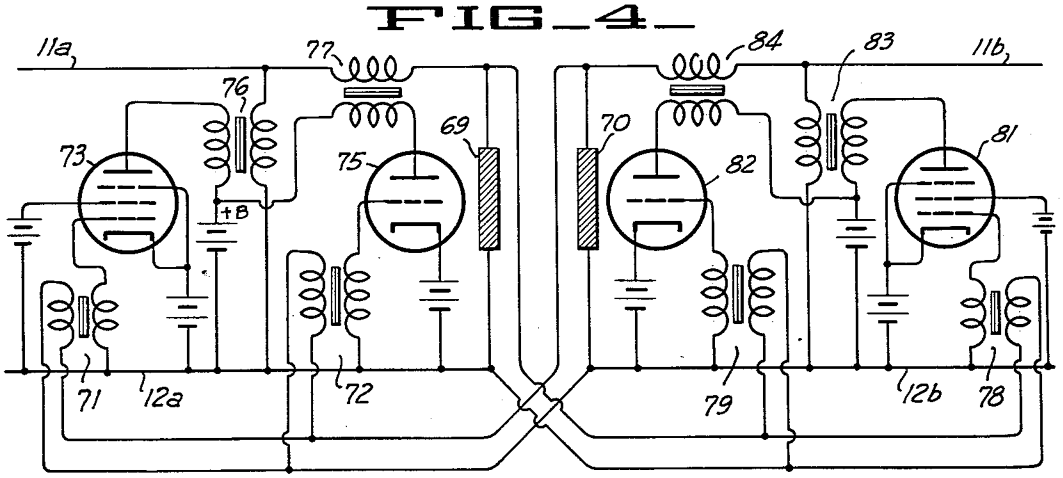
Figure 4 is a circuit diagram illustrating another embodiment of the invention having two-way directional characteristics, with an interrupted line circuit.

Figure 4 illustrates another embodiment of the invention in which directional coupling means is utilized in the outputs of the amplified tubes. In this instance suitable terminal impedances 69 and 70 are applied to the line conductors 11*a* and 12*a*, and 11*b* and 12*b*, in order to minimize reflection of signal energy. The primaries of the two transformers 71 and 72 are connected in shunt across the conductors 11*b* and 12*b*. The secondary of transformer 71 is connected in the control grid circuit of tube 73, and transformer 72 similarly has its secondary connected in the control grid circuit of tube 75. Output transformer 76 has its primary connected in the plate circuit of tube 73 and the terminals of its secondary connected directly across the conductors 11*a* and 12*a*. A second output transformer 77 has its primary connected in the plate circuit of tube 75, and its secondary in series with conductor 11*a*. The output transformers 76 and 77 are designed and connected to provide directional characteristics, whereby amplified signal energy is applied to the lines 11*a* and 12*a* for transmission to the left, with effective cancellation for transmission to the right.

For transmission in an opposite direction, input transformers 78 and 79 are connected to the conductors 11*a* and 12*a*, and serve to excite the grid cricuits of the tubes 81 and 82. The output transformers 83 and 84 similarly couple the outputs of the tubes 81 and 82 to the conductors 11*b* and 12*b*. Thus, for transmission of signals from left to right, the control grid circuits of tubes 81 and 82 are excited to apply amplified signal voltage to lines 11*b* and 12*b*, for transmission to the right. Here again the directional coupling means prevents direct feedback of energy between the output and input circuits of the amplifiers.

It will be apparent from the above that I have provided a system which can be used for amplification of signal energy in various line circuits, where directional characteristics are required. Coupling means employed can be relatively simple in contrast with the elaborate special transformer and networks required by present day directional amplifiers or repeaters. Because of the simplicity of the various arrangements which can be used, this invention can be readily adapted to any frequency or frequency range desired.

I claim:

1. In a system of the character described for amplification of signals being transmitted over a line circuit, vacuum tube amplifying means having an input and an output, directional means for coupling the input of the amplifier to the line circuit, said coupling means comprising means forming a high impedance in shunt with the line for deriving a voltage proportional to the line voltage, means forming a relatively low impedance in series with the line for deriving a voltage proportional to the line current, said derived voltages being out of phase for energy transfer through the line circuit in one direction, circuit means for combining the derived voltages, means for applying the combined voltages to the input of the amplifier, and directional means for coupling the output of the amplifier to said line circuit, said last named means comprising means for applying a voltage in shunt with the line circuit which is proportional to the output current, and means for applying a voltage in series with the line circuit which is proportional to the amplifier output current, said transduced voltages being out of phase for energy transfer in said one direction over the line circuit and in phase for transmission of energy over the line circuit in an opposite direction.

2. In a system of the character described for amplification of signals being transmitted over a line circuit, a line circuit comprising uninterrupted line conductors, a directional coupling means comprising high impedance means in shunt with the line circuit for deriving a voltage proportional to the line signal voltage and low impedance means in series with the line circuit for deriving a voltage proportional to the line signal current, said derived voltages being out of phase for signals transmitted through the line circuit in one direction and in phase for signals transmitted in the opposite direction, a vacuum tube amplifier having an input and output, a transformer having a primary and secondary winding, said primary winding connected to combine the said derived voltages and said secondary winding connected to the input of the said amplifier, means for directionally coupling the output of the amplifier to the line circuit, said last named means comprising first and second transformers each having a primary and a secondary winding, said first transformer having a secondary winding connected in shunt with the line circuit and said second transformer having its secondary winding connected in series with the line circuit, said primary windings connected to receive amplifier output current whereby voltages are developed across said secondary windings, said last named voltages being out of phase for energy transfer in said one direction over the line circuit and in phase for energy transferred in said opposite direction.

3. A system as in claim 2 comprising two vacuum tube amplifying means and coupling means therefor, said two amplifying means being coupled to the common line circuit for two way amplification of signals.

References Cited in the file of this patent

UNITED STATES PATENTS

| | | |
|---|---|---|
| 1,755,243 | Crisson | Apr. 22, 1930 |
| 2,423,416 | Sontheimer et al. | July 1, 1947 |
| 2,545,467 | Jeanlin | Mar. 20, 1951 |
| 2,588,390 | Jones | Mar. 11, 1952 |

FOREIGN PATENTS

| | | |
|---|---|---|
| 321,673 | Great Britain | Nov. 15, 1929 |
| 315,888 | Great Britain | Oct. 20, 1930 |